(12) United States Patent
Viswanathan

(10) Patent No.: US 11,805,390 B2
(45) Date of Patent: Oct. 31, 2023

(54) METHOD, APPARATUS, AND COMPUTER PROGRAM PRODUCT FOR DETERMINING SENSOR ORIENTATION

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 1307 days.

(21) Appl. No.: 16/210,252

(22) Filed: Dec. 5, 2018

(65) Prior Publication Data

US 2020/0186965 A1  Jun. 11, 2020

(51) Int. Cl.
*H04W 4/02* (2018.01)
*G05D 1/00* (2006.01)
*G06N 20/00* (2019.01)
*H04W 84/18* (2009.01)

(52) U.S. Cl.
CPC .......... *H04W 4/026* (2013.01); *G05D 1/0088* (2013.01); *G06N 20/00* (2019.01); *H04W 84/18* (2013.01)

(58) Field of Classification Search
CPC ...... G01C 21/26; G06N 20/00; G06N 3/0454; G06N 3/088; G05D 1/0088; H04L 67/12; H04W 4/02; H04W 4/026; H04W 4/38; H04W 4/44; H04W 84/18
See application file for complete search history.

(56) References Cited

U.S. PATENT DOCUMENTS

| | | | |
|---|---|---|---|
| 8,086,405 B2 | 12/2011 | Han et al. | |
| 2015/0153376 A1 | 6/2015 | Preston et al. | |
| 2021/0286079 A1* | 9/2021 | Liu | ...... G05D 1/0088 |

FOREIGN PATENT DOCUMENTS

| | | | | |
|---|---|---|---|---|
| EP | 1315945 B1 * | 3/2010 | ............. | G01C 21/26 |
| WO | WO 2018/000037 A1 | 1/2018 | | |

OTHER PUBLICATIONS

Axelsson, P. et al., *Estimation of Orientation and Position of an Accelerometer Mounted to an Industrial Manipulator*, Technical Report from Automatic Control at Linköpings universitet (Feb. 18, 2011) 9 pages.

(Continued)

*Primary Examiner* — Roy Y Yi
*Assistant Examiner* — Geoffrey T Evans
(74) *Attorney, Agent, or Firm* — ALSTON & BIRD LLP

(57) ABSTRACT

A method, apparatus, and computer program product are provided to determine sensor orientation. In the context of a method, the orientation of a sensor is predicted based on a predetermined dataset. The method also includes receiving information regarding a location of the sensor and information from which a gravity direction of the sensor is derivable. The method further includes determining a relative orientation of the sensor in relation to a frame of reference and the gravity direction of the sensor. The method still further includes comparing the orientation of the sensor that was predicted and the relative orientation of the sensor to determine a prediction accuracy. The method finally includes updating the predetermined dataset based on the prediction accuracy of the sensor orientation.

18 Claims, 4 Drawing Sheets

(56) References Cited

OTHER PUBLICATIONS

Ellingson, G. J. et al., *Deep Visual Gravity Vector Detection for Unmanned Aircraft Attitude Estimation*, 2017 IEEE/RSJ International Conference on Intelligent Robots and Systems (Sep. 2017) 9 pages.

Jaderberg, M. et al., *Spatial Transformer Networks* [online] [retrieved Feb. 1, 2019]. Retrieved from the Internet: <URL: https://arxiv.org/pdf/1506/02025.pdf>. (dated Feb. 4, 2016) 15 pages.

Mur-Artul, R. et al., *Visual-Inertial Monocular SLAM With Map Reuse* [online] [retrieved Feb. 1, 2019]. Retrieved from the Internet: <URL: https://arxiv.org/pdf/1610.05949.pdf>. (dated Jan. 17, 2017) 8 pages.

Kendall, A. et al., *PoseNet: A Convolutional Network for Real-Time 6-DOF Camera Relocalization* [online] [retrieved Feb. 1, 2019]. Retrieved from the Internet: <URL: https://www.cv-foundation.org/openaccess/content_iccv_2015/papers/Kendall-PoseNet_A_Convolutional_ICCV_2015_paper.pdf>. (Dec. 2015) pp. 2938-2946.

* cited by examiner

METHOD, APPARATUS, AND COMPUTER PROGRAM PRODUCT FOR DETERMINING SENSOR ORIENTATION

TECHNOLOGICAL FIELD

An example embodiment relates generally to a method and associated apparatus and computer program product for determining sensor orientation and, more particularly, to a method and associated apparatus and computer program product for determining an accuracy with which the sensor orientation has been predicted.

BACKGROUND

As technology advances, the variety and mobility of technology that can be used as a sensor has increased. Traditionally, a sensor was a dedicated hardware unit hardwired to a computer in order for the data read by the sensor to be analyzed. However, as technology has advanced, sensors have advanced as well. Current sensors may have internal processors that analyze the data or connect wirelessly to processors, allowing for remote use of sensors. Advances have also allowed for devices, such as cell phones, to serve multiple purposes, including as various types of sensors.

Crowdsourced data, from mobile devices, has become widespread and used in many efforts to advance different fields of technology, including vehicular navigation. With the increase in the number of ways to gather data and the number of devices that can gather data, the amount of available data is vast. This should only increase as technology advances and becomes even more widespread. However, in order for this data to be useful, it must first be normalized in some way to be used by data aggregators. For example, in vehicles, and specifically autonomous vehicles, gathering large amounts of data is useful, but without normalization, the reliability of the data is put in question. Normalizing data can be difficult as the sensors being used, often cell phones or other mobile devices, are mounted in such a manner that it is difficult to determine the orientation of the mobile device, which, in turn, is useful in normalizing the data collected thereby. Traditionally, there has been a reliance on precisely machined mounts, user inputted settings, or compute-intensive automated-techniques in order to determine sensor positioning. As more and different sensors are created and used, the reliable determination of location and orientation becomes even more challenging.

BRIEF SUMMARY

A method, apparatus, and computer program product are provided in accordance with an example embodiment in order to determine the orientation of a sensor. A large part of computer processing and advancement is based on the aggregation of data. However, data aggregation is only as good as the data that is received. Without some type of normalization, data, even in large quantities, is of limited, if any, use. With the increasing advancements in autonomous vehicles, the need for data normalization is especially true in order to permit the autonomous vehicles to be used effectively.

Autonomous vehicle manufacturers, among others, are desirous for information from vehicles, both autonomous and otherwise. Based on this demand, a large portion of this data is gathered through crowdsourcing. No longer do users need to have specialized sensors, but everyday devices, such as cell phones, can be used. This data can be detected and transmitted in near real time for use by data aggregators, both real and automated. However, not all devices are created equally and there is a need for an efficient way for data gathered by different devices to be combined in order for the data to serve its intended purpose. The mobility and variety of sensors creates distinct problems for those that depend on aggregated data. Specifically, the data received is not uniform in regards to the position and orientation. The use of different types of sensors only magnifies the problem. Therefore, in order to maximize the value of data, normalization of the data gathered regardless of the sensor type is advantageous. By determining a sensor's orientation, the data can be normalized and aggregated with data from other sources in order to improve the function of machines, such as autonomous vehicles, or devices that rely upon sensor data. By normalizing sensor data, it can be reliably aggregated in order to be used by autonomous vehicles or in other applications.

In this regard, a method, apparatus, and computer program product of an example embodiment permit the normalization of information gathered from unique sensors. As such, the method, apparatus, and computer program product will take information from a sensor, either ad-hoc or fixed, regardless of the sensor's position and normalize the data based on a pre-established point of reference. By relying on the same point of reference, sensor data from multiple sensors can be aggregated regardless of sensor type or location. For example, in autonomous vehicles, a person in a vehicle could use a cell phone as a sensor and with an example embodiment of this method, apparatus, and computer program product gather useful data about the vehicle's trip regardless of the orientation or location of the cell phone in the vehicle. The autonomous vehicle itself could use this data when normalized as a part of the decision making while on the road without the risk of inaccurate information. Additionally, the person could then share this data with a third party, such as a navigation service, and those third parties could effectively aggregate the normalized data with data from other vehicles to increase the overall accuracy with which navigation services are provided.

In an example embodiment, a method is provided for determining sensor orientation. The method includes predicting an orientation of a sensor based on a predetermined dataset. The method also includes a processor or the like receiving, from the sensor, information regarding a location of the sensor and information from which a gravity direction of the sensor is derivable. The processor then determines a relative orientation of the sensor in relation to a frame of reference and the gravity direction of the sensor. The method further includes comparing the orientation of the sensor that was predicted and the relative orientation of the sensor to determine a prediction accuracy. The method then includes updating the predetermined dataset based on the prediction accuracy of the sensor orientation.

In an example embodiment, the method includes receiving, from at least one additional sensor, information regarding a location of the at least one additional sensor and information from which a gravity direction of the at least one additional sensor is derivable. In such an example embodiment, some additional embodiments have a plurality of sensor types for the sensor and the at least one additional sensor.

In an example embodiment, the method further includes storing at least one of the predicted orientation of the sensor, the relative orientation of the sensor, or the prediction accuracy. In another embodiment, the method includes utilizing a neural network to establish the predetermined dataset using at least one of a known set of orientations or a loss function.

In an example embodiment, the sensor, from which the processor receives information in the method, is carried by a vehicle. In another embodiment, the method includes establishing the frame of reference for sensing by the sensor.

In another embodiment, an apparatus is provided that includes at least one processor and at least one memory including computer program code instructions, the computer program code instructions configured to cause the apparatus to determine sensor orientation. The computer program code instructions are configured to, when executed, cause the apparatus of this example embodiment to predict an orientation of a sensor based on a predetermined dataset. The computer program code instructions are further configured to, when executed, cause the apparatus receive, from the sensor, information regarding a location of the sensor and information from which a gravity direction of the sensor is derivable. The computer program code instructions are further configured to, when executed, cause the apparatus to determine a relative orientation of the sensor in relation to a frame of reference and the gravity direction of the sensor. The computer program code instructions are further configured to, when executed, cause the apparatus to determine a prediction accuracy by comparing the orientation of the sensor that was predicted and the relative orientation of the sensor. The computer program code instructions are further configured to, when executed, cause the apparatus to update the predetermined dataset based on the prediction accuracy of the sensor orientation.

In an example embodiment, the computer program code instructions are configured to, when executed, cause the apparatus to receive, from at least one additional sensor, information regarding a location of the at least one additional sensor and information from which a gravity direction of the at least one additional sensor is derivable. In such an example embodiment, some additional embodiments have a plurality of sensor types for the sensor and the at least one additional sensor.

In an example embodiment, the computer program code instructions are further configured to, when executed, cause the apparatus to store at least one of the predicted orientation of the sensor, the relative orientation of the sensor, or the prediction accuracy. In another embodiment, the computer program code instructions are further configured to, when executed, cause the apparatus to utilize a neural network to establish the predetermined dataset using at least one of a known set of orientations or a loss function.

In an example embodiment, the sensor, from which the apparatus receives information, is carried by a vehicle. In another embodiment, the computer program code instructions are further configured to, when executed, cause the apparatus to establish the frame of reference for sensing by the sensor.

In yet another example embodiment, a computer program product is provided that includes at least one non-transitory computer-readable storage medium having computer-executable program code portions stored therein with the computer-executable program code portions including program code instructions configured to predict an orientation of a sensor based on a predetermined dataset. The computer-executable program code portions also include program code instructions configured to receive, from the sensor, information regarding a location of the sensor and information from which a gravity direction of the sensor is derivable. The computer-executable program code portions further include program code instructions configured to determine a relative orientation of the sensor in relation to a frame of reference and the gravity direction of the sensor. Additionally, the computer-executable program code portions include program code instructions configured to have the processor compare the orientation of the sensor that was predicted and the relative orientation of the sensor to determine a prediction accuracy. The computer program instructions are further configured to update the predetermined dataset based on the prediction accuracy of the sensor orientation.

In an example embodiment, the computer code instructions is further configured to receive information regarding a location of at least one additional sensor and information from which a gravity direction of the at least one additional sensor is derivable. In such an embodiment, some additional embodiments have a plurality of sensor types for the sensor and the at least one additional sensor.

In an example embodiment, the computer code instructions are configured to store at least one of the predicted orientation of the sensor, the relative orientation of the sensor, or the prediction accuracy.

In an example embodiment, the sensor, from which the computer program product receives information in the computer code instructions, is carried by a vehicle. In another embodiment, the computer code instructions are configured to establish the frame of reference for sensing by the sensor.

In still another example embodiment, an apparatus is provided for determining sensor orientation. The apparatus includes means for predicting an orientation of a sensor based on a predetermined dataset. The apparatus also includes means for receiving information regarding a location of the sensor and information from which a gravity direction of the sensor is derivable. The apparatus further includes means for determining a relative orientation of the sensor in relation to a frame of reference and the gravity direction of the sensor. The apparatus still further includes means for comparing the orientation of the sensor that was predicted and the relative orientation of the sensor to determine a prediction accuracy. The apparatus also includes means for updating the predetermined dataset based on the prediction accuracy of the sensor orientation.

In an example embodiment, the apparatus includes means for receiving information regarding a location of the at least one additional sensor and information from which a gravity direction of the at least one additional sensor is derivable. In such an example embodiment, some additional embodiments have a plurality of sensor types for the sensor and the at least one additional sensor.

In an example embodiment, the apparatus further includes means for storing at least one of the predicted orientation of the sensor, the relative orientation of the sensor, or the prediction accuracy. In another embodiment, the apparatus includes means for utilizing a neural network to establish the predetermined dataset using at least one of a known set of orientations or a loss function.

In an example embodiment, the sensor is carried by a vehicle. In another embodiment, the apparatus includes means for establishing the frame of reference for sensing by the sensor.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
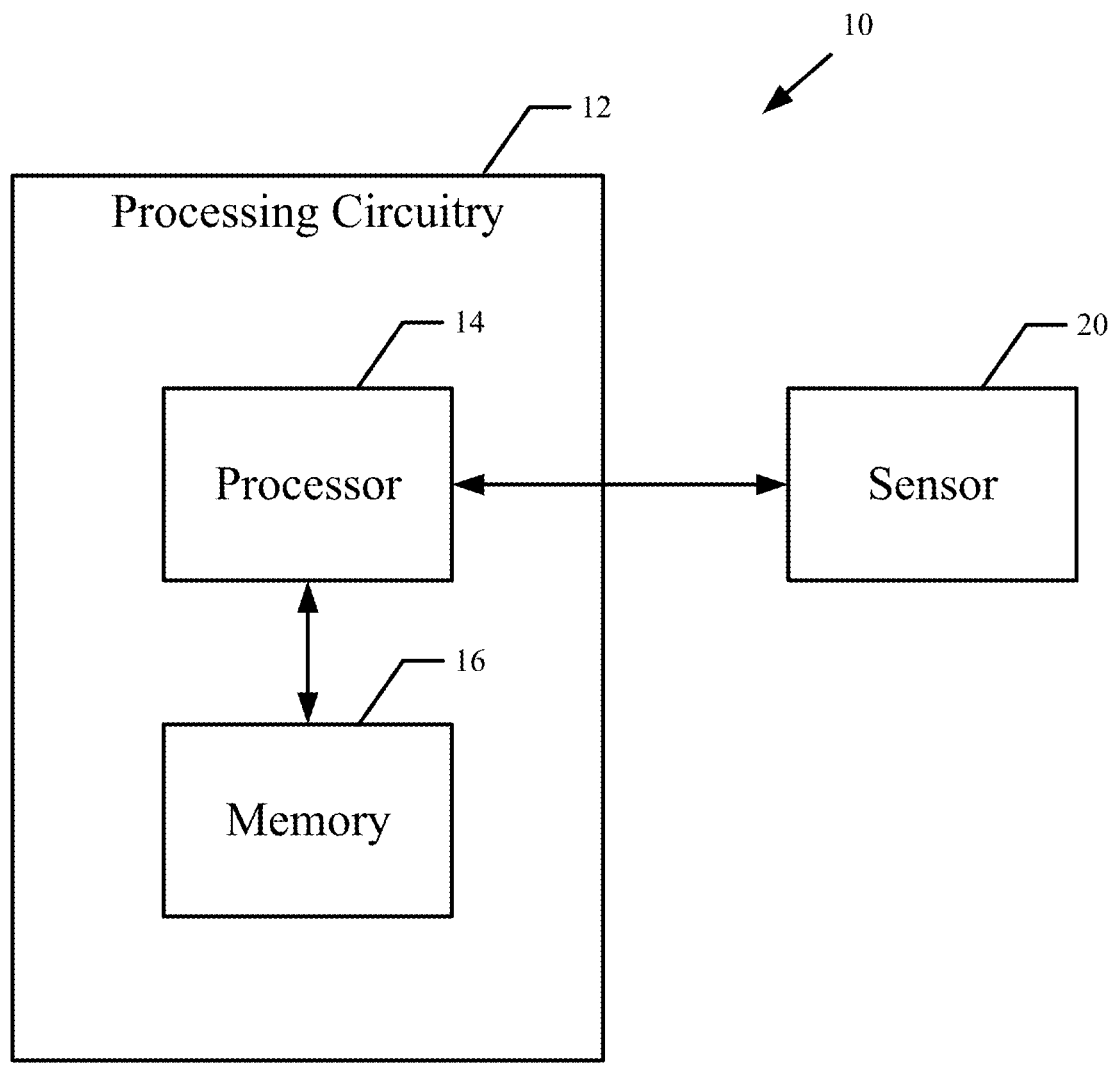
Figure 2:
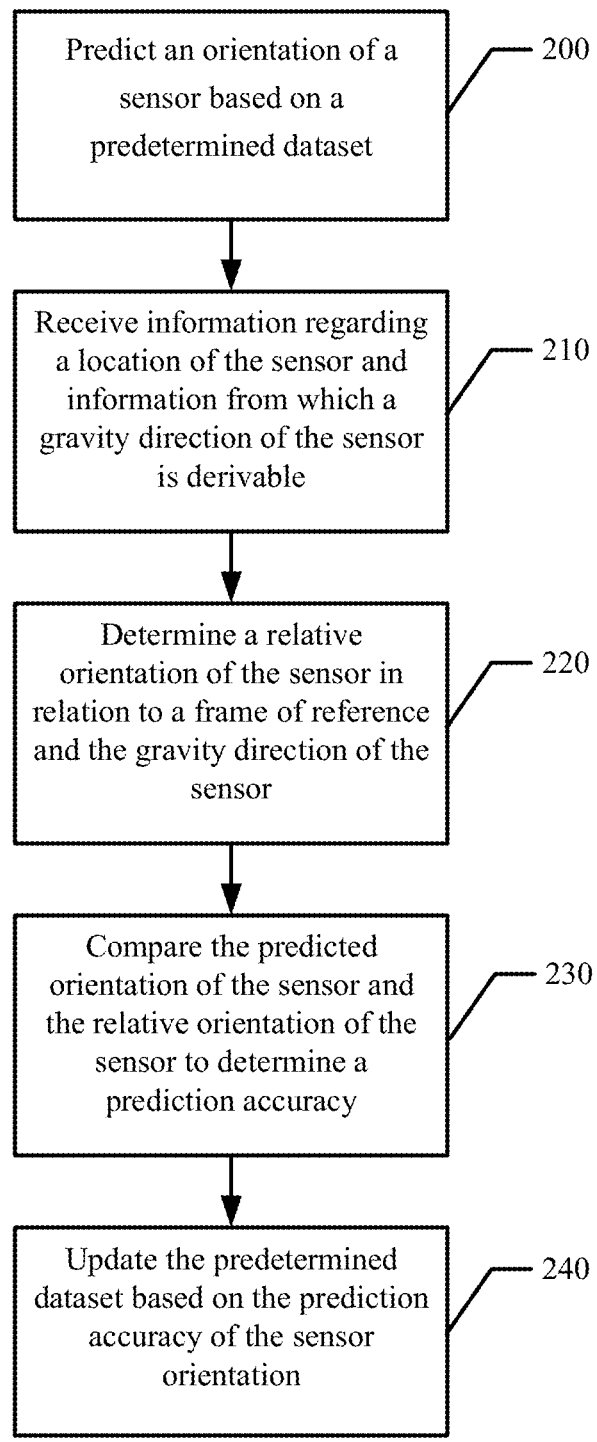
Figure 3:
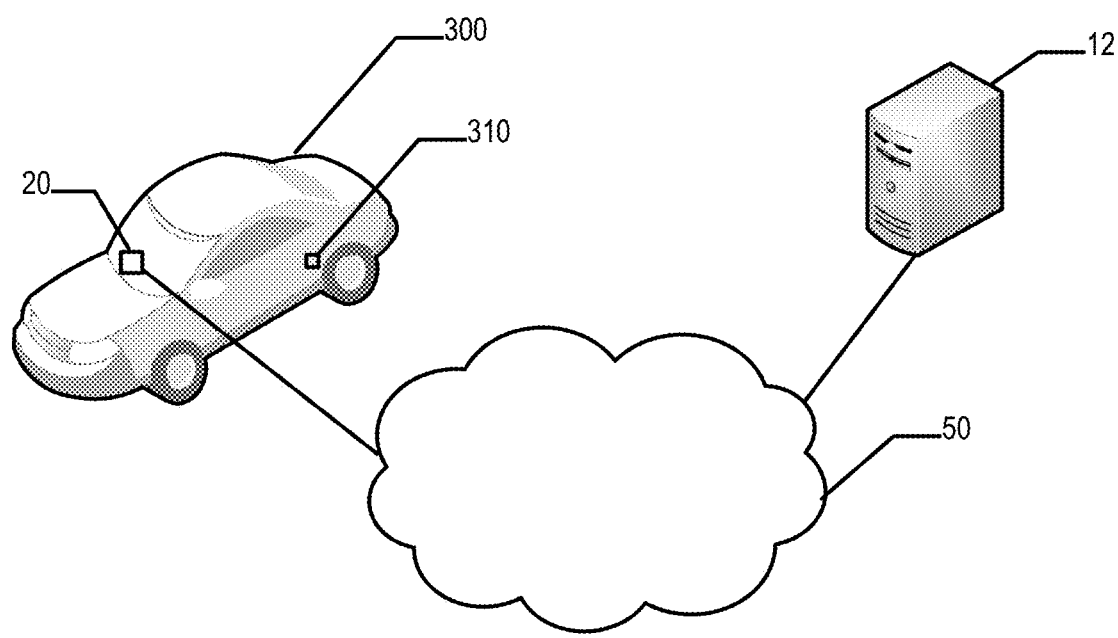
Figure 4:
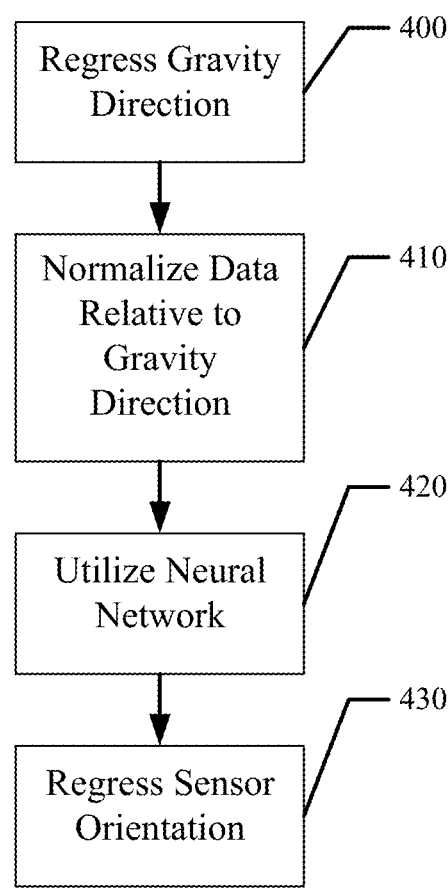

Having thus described certain example embodiments of the present disclosure in general terms, reference will hereinafter be made to the accompanying drawings, which are not necessarily drawn to scale, and wherein:

FIG. 1 is a block diagram of an apparatus configured in accordance with an example embodiment of the present disclosure;

FIG. 2 is a flowchart illustrating the operations performed, such as by the apparatus of FIG. 1, in accordance with an example embodiment of the present disclosure;

FIG. 3 illustrates a system including an example embodiment of the present invention wherein the sensor is carried by a vehicle; and FIG. 4 is a flowchart illustrating, according to an example embodiment, the operations performed, such as by the apparatus of FIG. 1, in determining a sensor's orientation.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A method, apparatus, and computer program product are provided in accordance with an example embodiment of the present invention for determining sensor orientation. In an example embodiment herein, the method, apparatus, and computer program are provided for facilitating autonomous and semi-autonomous driving in an environment. Autonomous vehicles leverage sensor information for various reasons including determining preferred regions of a road on which to drive and evaluating their surroundings as the vehicle traverses a road segment. Increasing the amount of usable data collected and analyzed is useful for the advancement of autonomous vehicles, including both fully autonomous and semi-autonomous vehicles.

Autonomous vehicles may also be equipped with a plurality of sensors to facilitate autonomous vehicle control. Sensors may include image sensors, such as cameras, Light Detection and Ranging (LiDAR), Global Positioning Systems (GPS), Inertial Measurement Units (IMUs), Radar, or the like which may measure or monitor the surroundings of a vehicle and communicate information regarding the surroundings to a vehicle control module or other controller to process and adapt vehicle control accordingly.

Using an image sensor such as a camera, a sensor may capture an image including colors and shadows, whereas a LiDAR image may include intensities of depth that do not directly correlate with the colors and shadows observed in the camera image. Conventional correlation methods cannot directly establish a distance metric between these images. In order to overcome this issue, a method of an embodiment described of normalizes the sensor data. Normalization, as detailed in the present disclosure, takes information received from a sensor and transforms the raw data into useful data by making the data location and/or orientation neutral meaning that the data can be combined with other similar data regardless of the sensor orientation and/or location at the time the data was captured. Through an accurate method of normalizing data from different sensors, the method of an example embodiment described herein can more readily and accurately use the data received from individual sensors.

FIG. 1 is a schematic diagram of an example apparatus configured for performing any of the operations described herein. Apparatus 10 is an example embodiment that may be embodied by or associated with any of a variety of computing devices that include or are otherwise associated with a device configured for providing an advanced driver assistance features, which may include or be in communication with one or more sensors 20. For example, the computing device may be an Advanced Driver Assistance System module (ADAS) which may at least partially control autonomous or semi-autonomous features of a vehicle; however other embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In an example embodiment, the apparatus 10 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 10 may include, be associated with, or may otherwise be in communication with processing circuitry 12, including, for example, a processor 14, a memory device 16, a communication interface (not shown), and at least one sensor 20. In some embodiments, the processor 14 (and/or co-processors or any other processing circuitry assisting or otherwise associated with the processor) may be in communication with the memory device 16 via a bus for passing information among components of the apparatus. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor.

Additionally or alternatively, the memory device could be configured to store instructions for execution by the processor.

The processor 14 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. The processor may be defined as a mobile phone.

In an example embodiment, the processor 14 may be configured to execute instructions stored in the memory device 16 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In an example embodiment, the processor is in the form of a mobile phone, which may also operate as a sensor.

The apparatus 10 may be equipped with any number of sensors 20, such as an image sensor, global positioning system (GPS), accelerometer, LiDAR, radar, and/or gyroscope. These sensors may be dedicated sensors or sensors of multipurpose devices, such as a mobile phone or the like. Any of the sensors may be used to sense information regarding the movement, positioning, or orientation of the device for use in assisting various operations of the vehicle, as described herein according to an example embodiment. In some example embodiments, such sensors may be implemented in a vehicle or other remote apparatus, and the information detected may be transmitted to the apparatus 10 (or other portions of the apparatus, such as the processor), such as by near field communication (NFC) including, but not limited to, Bluetooth™ communication, or other proximity based communication techniques. Additionally or alternatively, the information captured by the sensors may be communicated to the apparatus, such as the processor, via various cellular or other wireless protocols including Global System for Mobile Communications (GSM), such as but not limited to Long Term Evolution (LTE).

In an example embodiment, the sensor may be in communication with the processor 14 either directly or indirectly through a communication interface. The sensor may communicate with the processor 14 and the like by a wired connection or through a wireless connection. In this regard, the communication interface (not shown) may be any means such as a device or circuitry embodied in either hardware or a combination of hardware and software that is configured to receive and/or transmit data from/to the sensor(s) in communication with the apparatus, such as by proximity based techniques or via GSM or other cellular communication protocols. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication for vehicle to vehicle or vehicle to infrastructure wireless links.

The processor 14 and the like may receive data from the sensor(s) relating to identifying road geometry, lane lines, other vehicles, pedestrians, objects in or proximate the roadway, signs, road anomalies (e.g., temporary construction barricades), etc. Additionally, with this data, the processor 14 may also receive information relating to the position of the sensor(s) including the orientation of the sensor(s) at the time of data capture. This information relating to position and orientation may be in terms of absolute position, such as Global Position System (GPS) coordinates, or in relative position, such as distance from a point in a frame of reference. The processor 14, upon receiving the information from the sensor(s), may be configured to determine the orientation and position of the sensor and to normalize the data received relative to position and/or orientation of the sensor(s). In this regard, the apparatus 10, such as the processor, may interpret data collected by one or more sensors and then produce a normalized data point that can be combined with other sensor readings regardless of position or orientation at time of reading. This interpretation is discussed in more detail herein. In an example embodiment, the sensor(s) may be carried by a vehicle. In such an embodiment, the processor and the like may also be carried by the vehicle or may be remote from the vehicle carrying the sensor(s).

In one embodiment, as noted above, the end user device or mobile device 104 can be embodied by the apparatus 10 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. The sensor(s), as discussed herein, may also be embodied by the same mobile device or be separate, but in communication with the mobile device.

Autonomous driving has become a focus of recent technology as a result of advances in machine learning, computer vision, and computing power able to conduct real-time sensing of a vehicle's condition and environment. Such an understanding of the environment enables autonomous driving in at least two distinct ways. Primarily, real-time sensing of the environment may provide information about potential obstacles, the behavior of others on the roadway, and areas that are navigable by the vehicle. An understanding of where other cars are and what they may do is useful for a vehicle (or apparatus 10) to plan a route. Further, vehicles must be able to avoid both static and dynamic obstacles, which may change in terms of presence and position in real-time. Autonomous vehicles must also have a semantic understanding of what areas are around them that are navigable and acceptable for driving. Having mass normalized data both for individual vehicles and multiple vehicles can help to facilitate efficient operation of autonomous vehicles.

Autonomous vehicle navigation, for example, may rely heavily on GPS which can provide a real-time location with a 95% confidence interval of 7.8 meters according to the standards set by governing agencies. However, in complex urban environments, reflection of GPS signals in "urban canyons" can increase the error such that location may be off by as much as 30 meters or more. Given that the width of many vehicle lanes is typically four meters or less, this accuracy is insufficient to properly localize an autonomous vehicle to enable effective route planning decisions. Other sensors, such as inertial measurement units (IMUs) can increase the accuracy of localization by taking into account vehicle movement, but these sensors may drift and fail to provide sufficient accuracy.

Autonomous vehicle navigation requires localization accuracy, and accuracy to within 10 centimeters may provide sufficient accuracy for effective autonomous navigation. An understanding of the accuracy of onboard sensors is useful for autonomous driving control to establish the degree of reliance that autonomous controls may have on the data captured by the sensors regarding the environment of a vehicle. This accuracy may also be used to determine a degree to which a vehicle may rely on the stored data.

One aspect of insuring accuracy localization accuracy is knowing the position of the sensor itself. The positioning of the sensor within a vehicle has the potential to reduce the accuracy of data if the sensor position is not taken into account when the data is used. With the increase and variety in sensor types, sensors may be placed in various positions on autonomous vehicles. For example, more traditional sensors may be placed on the exterior of a vehicle, either removably or fixed, while other sensors, such as a cell phone, may be in the vehicle itself, such as in the passenger seat or on the dashboard. These devices may be fixed or removable. The normalization of data from multiple sensors is useful for ensuring the accuracy of the sensor data. Therefore, the determination of the orientation of a sensor allows for increased use of sensors and the data captured thereby without the need for complicated mounting or otherwise. This will lead to an increase in the amount of useful sensor data obtained. The normalization of this data also may allow those that use the data to aggregate the data across different brands, orientations, and positions.

Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, locating signs and identifying information communicated by the sign, or any boundary related details of the road links that may be traversed by the vehicle.

Autonomous vehicles, or vehicles with some level of autonomous controls, provide varying degrees of vehicle control that was previously performed by a person driving a vehicle. Removing some or all of the responsibilities of driving from a person and automating those responsibilities is premised upon a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a predictable manner. Additionally, the data gathered by the sensor(s) must be in a form that can be used to permit efficient navigation of a vehicle, such as an autonomous vehicle. The position and orientation of the sensor(s) itself impacts the data that is captured and the manner in which the data may be combined with other sensor data. Thus, the data captured by sensors is normalized so that the data can be used in a consistent manner, either with data from other sensors or independently, regardless of the location and orientation of the sensor(s).

Autonomous and semi-autonomous vehicles may use a variety of sensors to facilitate various autonomous functions. For example, adaptive cruise control functionality that maintains a following distance from a lead vehicle, and maintains a near-constant speed when not following another vehicle, requires at least sensors (e.g., sensor(s) 20 of FIG. 1) that can detect a vehicle in front of the autonomous or semi-autonomous vehicle. Such a sensor may be a distance sensor, such as LiDAR or other sensor having similar capabilities. Further, the autonomous or semi-autonomous vehicle must be equipped with control capabilities to facilitate braking of the vehicle and accelerating the vehicle. This sensor and control system may be a "sensor package" or level of sensor capabilities. Adaptive cruise control has become relatively common, such that a sensor package capable of adaptive cruise control may be a relatively rudimentary level of sensor capabilities relative to a vehicle that has full autonomous control.

Beyond adaptive cruise control, vehicles with more autonomy may be able to navigate roadways through lane changes, turns, stopping, starting, and generally performing all features of conventional driving that historically have been performed manually by a driver. In order to facilitate full autonomy, vehicles require a level of sensor capabilities that can identify road geometry, lane lines, other vehicles, pedestrians, objects in or proximate the roadway, signs, road anomalies (e.g., temporary construction barricades), etc. In order for the data collected by the sensors to be effectively utilized, the data must be normalized in relation to location and orientation of the sensor at the time of data capture. This normalization may include relating the position of the sensor to a frame of reference, as well as the gravity direction of the sensor, that is, the direction of the gravitational force. Such an advanced sensor package having a high level of sensor capabilities may be capable of full autonomous control of a vehicle in a manner that substantially replaces the driver. It is also appreciated that any degree of autonomy between no autonomy and full autonomy is also possible based on a sensor package installed in a vehicle or carried with a vehicle and a level of sensor capabilities of the sensor package.

According to certain example embodiments described herein, the sensors, carried by a vehicle may be used by that vehicle specifically. Additionally, the data captured by sensors may be used as a part of crowdsourced data from sensors onboard a wide number of vehicles in order to be utilized by a plurality of vehicles, generally on a more aggregated basis. Crowdsourcing is a way for vehicle manufacturers and others to increase their pool of data and, in turn, increase the reliability of calculations made based upon the data. Crowdsourcing can especially be effective if data can be combined, regardless of the sensor's brand or position in a vehicle. Certain embodiments described herein include a method, apparatus, and computer program product to determine the orientation of a sensor in a vehicle, such as an autonomous vehicles.

Referring now to FIG. 2, the operations performed by the apparatus 20 of an example embodiment of the present invention includes means, such as processing circuitry 12, the processor 14 or the like, for determining sensor orientation. In an example embodiment, detailed herein, the sensor is onboard a vehicle and, more specifically, an autonomous vehicle. As shown in block 200 of FIG. 2, the apparatus 10 includes means, such as the processing circuitry 12, the processor 14 or the like, for predicting the orientation of a sensor based on a predetermined dataset. The predetermined dataset may either be static or dynamically updated. The predetermined dataset may be provided in various manners. For example, the predetermined dataset may provide orientation information defining the predicted orientation of the sensor. The orientation information may be specific to the sensor or the type of sensor. The predetermined dataset may include information from prior instances in which the sensor or the same type of sensor was utilized regarding the orientation of the sensor or the orientation of the same type of sensor. In this regard, the apparatus, such as the processor, may utilize machine learning techniques, such as a neural network configured to utilize prior orientation information, such as from training data, to define the predicted orientation of the sensor.

In order to predict the orientation of the sensor, the sensor generally provides some information, such as the identity of the sensor and/or the type of sensor, or the sensor may provide more detailed information. In this regard, the orientation of a sensor relates to the directional location of a sensor when data is collected. As such, for a mobile phone, an image captured by a mobile phone may be provided. Based upon the image, the orientation may be predicted based upon whether the image is in landscape or portrait. Or, the orientation may be predicted based upon the relation between the sensor and true level or some other feature identified within the image. In a sample embodiment, the orientation of a mobile phone is established when the mobile phone is sitting on the dash of a vehicle. The data collected by the mobile phone sitting on the dash may be normalized based on the orientation of the mobile phone and therefore may not require rigid mounting. However, mounting may also be used for sensors. This mounting may be a precisely manufactured mounts. Additionally or alternatively, this mounting may vary from sensor to sensor in precision and size. In these embodiments, the sensor is held by the mounting such that the mounting defines the predicted orientation of the sensor.

Referring now to block 210 of FIG. 2, the apparatus 10 includes means, such as the processing circuitry 12, the processor 14 or the like, for receiving information regarding a location of the sensor and information from which a gravity direction of the sensor is derivable. The data received by the processor or the like may include data relating to identifying road geometry, lane lines, other vehicles, pedestrians, objects in or proximate the roadway, signs, and road anomalies (e.g., temporary construction barricades). In addition, the data may also include other data relating to the sensor orientation, position, and the gravity direction. The information regarding orientation, position, and gravity direction may come in various forms, either relative or absolute. For example, some sensors may transmit an absolute position, such as provided by GPS, while others may provide one relative to a frame of reference or the like. Additionally, the information relating to the gravity direction may be provided in absolute terms, such as from a gyroscope of the apparatus, or may be determined by the processor and the like, such as by analyzing features in an image captured by a sensor, e.g., a camera, that have a predefined relationship to gravity. The information relating to the gravity direction of the apparatus may be transformed, such as based on an angular offset, based on a known gravity direction.

The orientation, position, and gravity direction may naturally be dynamic, especially if the sensor is not rigidly mounted. The frequency that the orientation, positions, and gravity direction are updated may be based on the level of accuracy desired from the data. For example, certain systems of an autonomous vehicle may require almost real time updates to orientation, position, and gravity direction in order to meet the desired performance level. Other systems, however, may allow for a higher margin of error and therefore could have longer intervals between refreshes. A longer refresh time of the apparatus may reduce the accuracy, but would reduce computing usage. The refresh times of the apparatus may be statically defined or may be dynamic based on a number of factors, including desired computing usage, desired margin of error, sensor refresh rate (e.g., if a sensor updates at 100 Hz, the orientation estimate may be slower at around 1 Hz), and the like.

As shown in block 220 of FIG. 2, the apparatus 10 includes means, such as the processing circuitry 12, the processor 14 or the like, for determining a relative orientation of the sensor in relation to a frame of reference and the gravity direction of the sensor. In order for data from multiple separate sensor readings to be combined in a useful way, then the orientation, location, and gravity direction of the sensors at the time of reading are first normalized. When data is normalized, a larger pool of possible data points that can be compiled in an effective manner. This normalization may be done through the use of a frame of reference. This frame of reference is a known point or points and/or a known set of orthogonal axes, whether static or dynamic, that travels in concert with and in proximity to a sensor in order for the location and orientation of the sensor to be determined. Any predefined location and/or set of reference axes that moves with the vehicle may be a frame of reference. This frame of reference could be the center of mass of a vehicle, a rear axle of a vehicle, or the front end of a vehicle. When additional sensors are used on other vehicles the frame of reference must be the same between vehicles, for example if the center of mass for one vehicle is the frame of reference for that vehicle, then the frame of reference for a second sensor on a second vehicle would have to be the center of mass of the second vehicle in order to be used correctly. The frame of reference may be a predetermined location on a vehicle (e.g., a conventional location for the frame of reference may be the rear axle center) or may be different for various sensor types.

Referring next to block 230 of FIG. 2, the apparatus 10 includes means, such as the processing circuitry 12, the processor 14 or the like, for comparing the predicted orientation of the sensor and the relative orientation of the sensor to determine a prediction accuracy. This comparison may be done in various manners including by assigning a rotational grid to the orientation with the degrees difference between predicted and relative orientations being used to determine the prediction accuracy. Additionally or alternatively, the prediction accuracy may be determined utilizing a cross-entropy loss function. For example, the cross-entropy loss function minimization may involve reducing the errors between the predicted orientation and the observed orientation. An angular loss function may be implemented in conjunction with or in place of the cross-entropy loss function to determine the prediction accuracy. For example, the angular loss function may determine the angular error between the actual direction of gravity and the predicted direction of gravity, and the apparatus, such as the processor 14, may use the angular error to signal the true value of the orientation.

Referring next to block 240 of FIG. 2, the apparatus 10 includes means, such as the processing circuitry 12, the processor 14 or the like, for updating the predetermined dataset based on the prediction accuracy of the sensor orientation. The dataset may be either simultaneously updated or updated later in time. In either example embodiment, a storage device may be provided for storing the information relating to predicted orientation, relative orientation, and/or prediction accuracy. The update itself may be done by combining the current data relating to the predicted orientation and the prediction accuracy with the previous dataset. Alternatively, the update may completely overwrite the previous dataset, creating a distinctly new dataset. This iterative updating, or training, of the system allows for increased accuracy with subsequent usage. Therefore, the dataset may become more robust and accurate, and allows for predicted orientation that are more accurate as the system is repeatedly used.

FIG. 3, shows vehicle 300 using an example embodiment of the apparatus, such as the one shown in FIG. 1. The frame of reference 310 is a known location and/or a known set of orthogonal reference axes which other locations can be determined relative to the frame of reference. In the present example, the frame of reference could be any point on the vehicle. The frame of reference 310 used by the apparatus, in the present embodiment, may be a fixed point on the vehicle. Alternatively, the frame of reference may be dynamic as long as the location is known. By way of example, the frame of reference may be the rear axle, the center of gravity, or the like. For example, the frame of reference 310 in FIG. 3 is a point near the rear axle of the vehicle. In various embodiments, the frame of reference may be at different locations on the vehicle; however, to increase the usefulness of the aggregated data, a consistent frame of reference across the aggregated dataset may be useful when combining data.

Additionally, in an example embodiment, the sensor may be carried by the vehicle. The sensor may be carried at any location on the vehicle, either externally or internally. As shown in FIG. 3, sensor 20 is on the dash of the vehicle. In some embodiments, the sensor may be fixed to the vehicle. The affixing may be done using a mount, adhesive, or otherwise. Additionally, the sensor may be removable. The processing circuitry of an example embodiment is configured to receive information from multiple sensors. These multiple sensors may be located in or on the same vehicle. The multiple sensors may alternatively be in or on different vehicles, with readings taken simultaneously or at different times. The multiple sensors may be different types of sensors, including, but not limited to different brands, functionality, and uses of the sensor.

In the example embodiment of FIG. 3, the processing circuitry 12 receives from the sensor information a location of the sensor and information from which a gravity direction of the sensor is derivable. This reception by the processing circuitry may be direct or indirect. Direct reception may be done through a wired connection. Indirect reception may be provided, as shown in FIG. 3, through a wireless connection 50. This wireless connection could be Bluetooth, Wi-Fi, or other proximity based communication techniques. The processing circuitry 12 may be located either insider or outside of the vehicle, as shown in FIG. 3. The processing circuitry 12 may also be carried by the same vehicle as the sensor. Additionally, some sensors, such as a mobile phone, may have the processing circuitry embedded into the sensor. The processing circuitry 12 may also be communication with multiple sensors simultaneously. For example, the processing circuitry 12 may be carried by one vehicle and receive information from sensors in that vehicle, as well as from sensors in other vehicles via wireless connections discussed above. Additionally, the processing circuitry may have multiple parts, such as the processor 14 and the memory device 16, which may either be proximate to each other or be separate. In an example embodiment, part of the processing circuitry may be carried by a vehicle, while another part is not carried by the vehicle. Still further, the processor of other embodiments may be remote from the sensors, but in communication therewith, such as by wireless communication protocols.

Referring now to FIG. 4, the operations provided is a detailed example embodiment of the operations shown in FIG. 2. The operations, shown in FIG. 4, performed by the apparatus 20 of an example embodiment of the present invention includes means, such as processing circuitry 12, the processor 14 or the like, for determining sensor orientation. As discussed above, these operations can be done using either software, hardware, or a combination thereof. As shown in block 400 of FIG. 4, the apparatus 10 includes means, such as the processor 14, to regress the gravity direction. This regression may be done through a transformer network, such as may be implemented by the processor. A transformer network takes the information relating to the gravity direction of the sensor(s) and produces re-oriented data aligned to the gravity direction. The re-orientated data may then be complied with other information regardless of the gravity direction. The transformer network may be trained by using gravity direction information from past collections. This gravity direction information may be obtained by receiving, for each captured sensor reading, the direction of the gravity. In an example embodiment, an image captured by the camera of a mobile phone is automatically associated with the gravity direction from the internal gyroscope. The gravity direction information may also include a horizon-detector that analyzes an image to identify the horizon and then provides the perpendicular direction to the gravity-vector and can directly be utilized. Therefore, the regression may be a simple reception by the processor when the gravity direction information is automatically provided by the sensor, such as the case of a sensor that includes a gyroscope, or may include a conversion from other information to the gravity direction. In an example embodiment, the data produced is gravity direction neutral due to the re-orientation and alignment with the gravity direction.

As shown in block 410 of FIG. 4, the apparatus includes means, such as the processor 14, to normalize the data relative to the gravity direction. After the processor or the like receives information from the sensor relating to the gravity direction as discussed above and uses this information to directly or indirectly regress the gravity direction, the data is then normalized based on that information. This normalization may be done, as described above, using a variety of methods based on the information relating to the gravity direction received from the sensor.

Moving to block 420 of FIG. 4, the apparatus includes means, such as the processor 14, for utilizing a neural network, such as may be implemented by the processor, to regress the sensor orientation. The neural network may be layered with multiple corresponding inception modules, such as a PoseNet Network, a modified U-Net architecture, or another type of auto-encoder style-network. The neural network may be trained using the transformed data from the gravity direction regression with a corresponding known set of orientations from a training dataset. This training may happen once when the network is created and/or may be updated, or trained, from time to time. These updates may be scheduled or may occur in real time. The neural network may use a loss function to train the network. This loss function may be a cross-entropy loss function, as discussed above. Additionally or alternatively, the network may utilize an angular loss function to minimize the difference between estimated gravity direction and true gravity direction, as discussed above. In some embodiments, the output of the network may also involve regressing the estimated errors between the estimated gravity direction and the observed gravity direction. In such an embodiment, the estimated errors between the gravity directions may be used to incorporate uncertainty measurements into the data aggregation. The network may use other functions to approximate the gravity direction and/or the sensor orientation. The network may use data gathered from other sensors across various brands and sensor types in training the network. This fine-tuning of the network increases the confidence level of the network. Therefore, as the network has more sensor readings, the margin of error may decrease.

As shown in block 430 of FIG. 4, the apparatus includes means, such as the processor 14, for regressing sensor orientation. This regression as discussed in depth above, may be completed using the neural network. This neural network may have been previously trained or may be static based on a list of known set of orientations. The neural network may also be a combination of initial known sets of orientations and additional training through iterative methods. Additionally, there may be an option to perform an inference as to the relative orientation while utilizing a portion of the neural network. This inference requires low computing power relative to using the entire neural network and transformed data. The inference may be made by the sensor itself when the sensor is embodied by a multipurpose device, such as a mobile phone. The accuracy of the data to be normalized will determine whether an inference would be sufficient. For example, in some aspects of autonomous vehicles where accuracy is not as important, an inference may be appropriate. This may allow the apparatus to save computing power for other areas, such as lane tracking. After the sensor orientation has been regressed, the data may then be normalized across sensor orientation in addition to across the gravity direction. This normalization produces data that is agnostic as to the gravity direction and sensor orientation allowing for a multitude of sensor data to be combined in a more efficient manner.

As described above, FIGS. 2 and 4 illustrate flowcharts of an apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 16 of a software development test platform employing an embodiment of the present invention and executed by the processing circuitry 12, the processor 14 or the like of the software development test platform. As will be appreciated, any such computer program instructions may be loaded onto a computer or other programmable apparatus (e.g., hardware) to produce a machine, such that the resulting computer or other programmable apparatus implements the functions specified in the flowcharts blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. The method for determining sensor orientation, the method comprising:
    utilizing a neural network to establish a predetermined dataset using at least one of a known set of orientations or a loss function, wherein the predetermined dataset provides information pertaining to i) an orientation of a sensor or ii) a type of sensor;
    predicting an orientation of the sensor based on the predetermined dataset;
    receiving, from the sensor, information regarding a location of the sensor and information from which a gravity direction of the sensor is derivable;
    determining, via a processor, a relative orientation of the sensor in relation to a frame of reference and the gravity direction of the sensor;
    normalizing data from the sensor relative to the location and the orientation of the sensor to produce normalized data that is combinable with other sensor readings regardless of position or orientation;
    comparing the orientation of the sensor that was predicted and the relative orientation of the sensor to determine a prediction accuracy; and
    updating the predetermined dataset based on the prediction accuracy of the sensor orientation.

2. The method according to claim 1 further comprising receiving, from at least one additional sensor, information regarding a location of the at least one additional sensor and information from which a gravity direction of the at least one additional sensor is derivable.

3. The method according to claim 2, wherein the sensor and the at least one additional sensor have a plurality of sensor types.

4. The method according to claim 1 further comprising storing, via a storage device, at least one of the predicted orientations of the sensor, the relative orientation of the sensor, or the prediction accuracy.

5. The method according to claim 1, wherein the sensor is carried by a vehicle.

6. The method according to claim 1 further comprising establishing the frame of reference for sensing by the sensor.

7. An apparatus for determining sensor orientation, the apparatus comprising at least one processor and at least one non-transitory memory including computer program code instructions, the computer program code instructions configured to, when executed, cause the apparatus to:
    utilize a neural network to establish a predetermined dataset using at least one of a known set of orientations or a loss function, wherein the predetermined dataset provides information pertaining to i) an orientation of a sensor or ii) a type of sensor;
    predict an orientation of the sensor based on the predetermined dataset;
    receive information regarding a location of the sensor and information from which a gravity direction of the sensor is derivable;
    determine a relative orientation of the sensor in relation to a frame of reference and the gravity direction of the sensor;
    normalize data from the sensor relative to the location and the orientation of the sensor to produce normalized data that is combinable with other sensor readings regardless of position or orientation;
    compare the orientation of the sensor that was predicted and the relative orientation of the sensor to determine a prediction accuracy; and
    update the predetermined dataset based on the prediction accuracy of the sensor orientation.

8. The apparatus according to claim 7, wherein the computer program code instructions are further configured to, when executed, cause the apparatus to receive, from at least one additional sensor, information regarding a location of the at least one additional sensor and information from which a gravity direction of the at least one additional sensor is derivable.

9. The apparatus according to claim 8, wherein the sensor and the at least one additional sensor have a plurality of sensor types.

10. The apparatus according to claim 7, wherein the computer program code instructions are further configured to, when executed, cause the apparatus to store, via a storage device, at least one of the predicted orientations of the sensor, the relative orientation of the sensor, or the prediction accuracy.

11. The apparatus according to claim 7, wherein the sensor carried by a vehicle.

12. The apparatus according to claim 7, wherein the computer program code instructions are further configured to, when executed, cause the apparatus to establish the frame of reference for sensing by the sensor.

13. A computer program product comprising at least one non-transitory computer-readable storage medium having computer-executable program code portions stored therein, the computer-executable program code portions comprising program code instructions configured to:
    utilize a neural network to establish a predetermined dataset using at least one of a known set of orientations or a loss function, wherein the predetermined dataset provides information pertaining to i) an orientation of a sensor or ii) a type of sensor;
    predict an orientation of the sensor based on the predetermined dataset;
    receive, from the sensor, information regarding a location of the sensor and information from which a gravity direction of the sensor is derivable;
    determine a relative orientation of the sensor in relation to a frame of reference and the gravity direction of the sensor;
    normalize data from the sensor relative to the location and the orientation of the sensor to produce normalized data that is combinable with other sensor readings regardless of position or orientation;
    compare the orientation of the sensor that was predicted and the relative orientation of the sensor to determine a prediction accuracy; and update the predetermined dataset based on the prediction accuracy of the sensor orientation.

14. The computer program product according to claim 13, wherein the program code instructions are further configured to receive information regarding a location of at least one additional sensor and information from which a gravity direction of the at least one additional sensor is derivable.

15. The computer program product according to claim 14, wherein the sensor and the at least one additional sensor have a plurality of sensor types.

16. The computer program product according to claim 13, wherein the program code instructions are further configured to store at least one of the predicted orientations of the sensor, the relative orientation of the sensor, or the prediction accuracy.

17. The computer program product according to claim 13, wherein the sensor is carried by a vehicle.

18. The computer program product according to claim 13, wherein the program code instructions further are configured to establish the frame of reference for sensing by the sensor.

* * * * *